United States Patent
Higuchi et al.

(10) Patent No.: US 6,587,922 B2
(45) Date of Patent: Jul. 1, 2003

(54) MULTIPROCESSOR SYSTEM

(75) Inventors: Tatsuo Higuchi, Fuchu (JP); Shinichi Kawamoto, Hachiouji (JP); Naoki Hamanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 124 days.

(21) Appl. No.: 09/820,948

(22) Filed: Mar. 30, 2001

(65) Prior Publication Data

US 2002/0013886 A1 Jan. 31, 2002

(30) Foreign Application Priority Data

Mar. 30, 2000 (JP) ..................................... 2000-094780

(51) Int. Cl.[7] ............................................. G06F 12/08
(52) U.S. Cl. ........................ 711/121; 711/120; 711/145
(58) Field of Search ................................. 711/119, 120, 711/121, 124, 141, 144, 145, 146, 130

(56) References Cited

U.S. PATENT DOCUMENTS

| | | | |
|---|---|---|---|
| 4,713,755 A | 12/1987 | Worley et al. | ............... 711/123 |
| 6,292,872 B1 * | 9/2001 | Arimilli et al. | ............. 711/146 |
| 6,385,702 B1 * | 5/2002 | Arimilli et al. | ............. 711/144 |

OTHER PUBLICATIONS

Parallel Computer Architecture, pp. 277–301, 555–556, Culler et al., 1999.
IEEE Micro, Jan./Feb. 1988, pp. 39–49, "Starfire:Extending the SMP Envelope," Charlesworth.

* cited by examiner

Primary Examiner—Gary J Portka
(74) Attorney, Agent, or Firm—Antonelli, Terry, Stout & Kraus, LLP

(57) ABSTRACT

A multiprocessor system can reduce a broadcast for cache memory consistency control with memory access from an I/O device. The multiprocessor system is provided with a cache memory identifier or an owner tag, and a block length table for recording a memory write block length of the I/O device. The cache memory identifier records that the cache has an exclusive copy. The owner tag records that there is no cache memory having an exclusive copy. If there is an exclusive copy during read through the I/O device, a read request is issued to both a cache holding the copy and a memory. If it is recorded that the copy is not present, data are directly read from the memory. Moreover, when a write block length is recorded in the block length table during write, whole blocks are collected to issue a request for invalidation from the cache and the request is directly written to the memory after the invalidation is completed.

2 Claims, 4 Drawing Sheets

MULTIPROCESSOR SYSTEM

BACKGROUND OF THE INVENTION

The present invention relates to an effective technique to be applied to a multiprocessor system configuration method for carrying out consistency control of a cache memory and a cache consistency guaranteeing method wherein a multiprocessor system has a plurality of processors and a cache memory per one processor or more, and more particularly, wherein a sharing memory type multiprocessor system has a plurality of nodes which have respective processors and share a memory through a network.

Conventionally, a symmetrical multiprocessor (hereinafter referred to as an SMP) having a plurality of processors where shares a memory space is often used as a computer for simultaneously multi-processing a plurality of processing requests for a sharing resource such as a transaction processing or a large scale database processing. On the other hand, in a recent processor has an operating frequency thereof has a high speed. In order to solve the problem of a deterioration in performance due to an access time of a main storage (hereinafter referred to as a memory) constituted by a DRAM which is an element having a large capacity and a low speed, processors having a cache memory with a small capacity and a high speed are increased. In the SMP constituted by using a plurality of processors having such a cache memory, consistency between cache memories should be guaranteed. In a bus coupling type SMP, for example, there is used such a method that a memory reference request sent from each of processors is monitored by all the other processors and, thereby, consistency between cache memories is guaranteed. The method is referred to as a "snoop bus method" (cited reference 1: see "Parallel Computer Architecture" ISBN 1-55860-343-3, pp 277 to 301).

In such a snoop bus method, memory reference requests are transmitted from all processors through a snoop bus to a memory. Therefore, the snoop bus becomes a bottleneck of a system. As a method for decreasing the number of request issues sent from each of the processors to the snoop bus with a memory access, generally, a "write back method" is used. However, even if the number of processors is to be increased to enhance the performance of the SMP of the snoop bus method, an electrical load to be applied to one bus is increased. Therefore, the maximum number of processors is limited. As a method of further increasing the number of processors, there is often used a "switch coupling type SMP" for coupling each of the processors by means of a cross bus switch or the like in place of the bus. In such a switch coupling type SMP, there is used a "switch broadcasting method" for broadcasting a memory reference request sent from a certain processor through the cross bus switch to all processors in order to take over a feature of the snoop bus, that is, the feature being "all processors monitor a memory reference request sent to a bus" (cited reference 2: see "Parallel Computer Architecture" ISBN 1-55860-343-3, pp 555 to 556).

On the other hand, an I/O device such as a disk device or a network interface, and a processor share a memory, thereby exchanging data. For example, in the case in which a file is to be read from the disk device, the processor addresses a memory (referred to as a buffer) for storing the data read out and activates a DMA write for the disk device. The disk device reads a file recorded in a disk and writes data to the addressed buffer. At this time, if the consistency guarantee of a processor cache is not carried out for data write from the disk device, the processor refers to old data in the cache memory despite the update of contents of the memory through the disk device. As a method for solving this problem, for example, there is used a "snoop type coherent I/O method" applying the above-mentioned "snoop bus method" to a memory access sent from the I/O device, or an "explicit flash method" for explicitly flashing the contents of the processor cache before the processor carries out DMA activation for the I/O device (cited reference 3: see U.S. Pat. No. 4,713,755 "Cache Memory Consistency Control with Explicit Software Instructions".

SUMMARY OF THE INVENTION

In the SMP using the switch broadcasting method described above, however, the following problems arise from the application of the snoop type coherent I/O method. In the switch broadcasting method, a memory reference request sent from the I/O device must be broadcast to all processors by means of a switch in order to guarantee the cache consistency of all the processors in the switch broadcasting method. However, the broadcast of the I/O device through the memory reference request disturbs the memory reference request of the processor. Therefore, the memory reference of the processor is delayed so that there is the drawback that whole performance thereof decreases. Moreover, a cache becomes busy due to the execution of consistency guarantee check of the caches of all the processors through the broadcast. Consequently, a cache access sent from each of the processors is inhibited so that there is the drawback that a cache access latency thereof increases.

Furthermore, in the case in which the "explicit flash method" is to be applied, it is considered that the following problems arise. The explicit flash method utilizes the feature, "a buffer region which an I/O device accesses is defined before DMA activation is carried out in a processor", and, in order to previously guarantee that a copy in the buffer region is not present in all caches, broadcasts a flash request to all processors through a switch only in this buffer region. In the processor receiving the flash request, if the state of the cache is "updated", the newest contents are written back to the memory and the cache is set to be "invalid" because the contents of the cache is the newest. If the state of the cache is not "updated", the cache is simply "invalidated". Referring to the DMA access sent from the I/O device, consequently, it is not necessary to carry out the broadcast for the consistency guarantee of the cache. In the present method, however, it is necessary to successively execute the explicit flash and the memory access through the I/O device. For this reason, there is the drawback that file access time is prolonged and system performance thereof accesses, for example.

Therefore, an object of the present invention is to provide a multiprocessor system capable of reducing a broadcast for cache consistency control for a memory access sent from an I/O device and implementing a high-speed I/O processing. In order to achieve the object, the present invention has a first problem to reduce a broadcast for cache consistency control related to a memory read request sent from an I/O device. Furthermore, the present invention has a second problem to reduce a broadcast for cache consistency guarantee related to a memory write request sent from the I/O device.

The above and other objects and novel features of the present invention will be apparent from the description and accompanying drawings in this specification.

The summary of the typical invention disclosed in the present application will be briefly described below.

In order to attain the first object, a multiprocessor of the present invention comprises a first means for recording one of both an identifier of the cache memory if the cache memory has an exclusive copy of a memory location capable of being cached and the report that no cache memory, otherwise, has the exclusive copy, wherein when one of the processor and the I/O device issues a read request for the memory location capable of being cached, the first means carries out one of: a first step of, if the identifier is recorded, transmitting a message for determining whether or not only the cache memory with the exclusive copy has a "updated" copy, and carrying out one of, when the cache memory with the exclusive copy has a "updated" copy, supplying data from the cache memory with the exclusive copy and of, otherwise, reading data from the memory; a second step of, if the report is recorded, reading data directly from the memory; and a third step of, if the identifier is recorded and a cache memory other than the cache memory with the exclusive copy has a "updated" copy, transmitting a message for determining whether or not all of the cache memory have "updated" copies, and carrying out one of, when at least one of all of the cache memory has a "updated" copy, supplying data from the at least one of all of the cache memory and of, otherwise, supplying data from the memory.

In order to attain the second object, the present invention of the present invention comprises a first means for recording a write unit to the memory per the respective I/O devices; and a second means for, when the I/O devices carry out a memory write to a memory block containing a plurality of cache lines, examining whether or not the memory write unit of the respective I/O devices is recorded in the first means, wherein if the memory write unit is recorded, the second means carries out the steps of: broadcasting a request for invalidating all caches relative to a continuous region shown by the write unit recorded in the first means from a starting address of the memory block to all the caches; invalidating the cache memory receiving an invalidation request of the caches when the cache memory receiving the invalidation request has a copy corresponding to the continuous region; and directly reading the cache to data for the memory block after all the caches memory are completely invalidated.

Effects obtained by the typical invention disclosed in the present application will be briefly described below.

According to the multiprocessor system of the present invention, it is possible to reduce a broadcast for cache consistency control related to a memory read request sent from the I/O device, and furthermore, to reduce a broadcast for cache consistency guarantee related to a memory write request sent from the I/O device. As a result, it is possible to reduce a broadcast for cache consistency control related to a memory access sent from the I/O device, thereby implementing a high speed I/O processing. Moreover, it is possible to reduce a memory reference latency through a processor to improve the performance of the whole system by reducing a broadcast to all the nodes.

BRIEF DESCRIPTIONS OF THE DRAWINGS

DESCRIPTION OF THE PREFFERRED EMBODIMENTS

Figure 1:
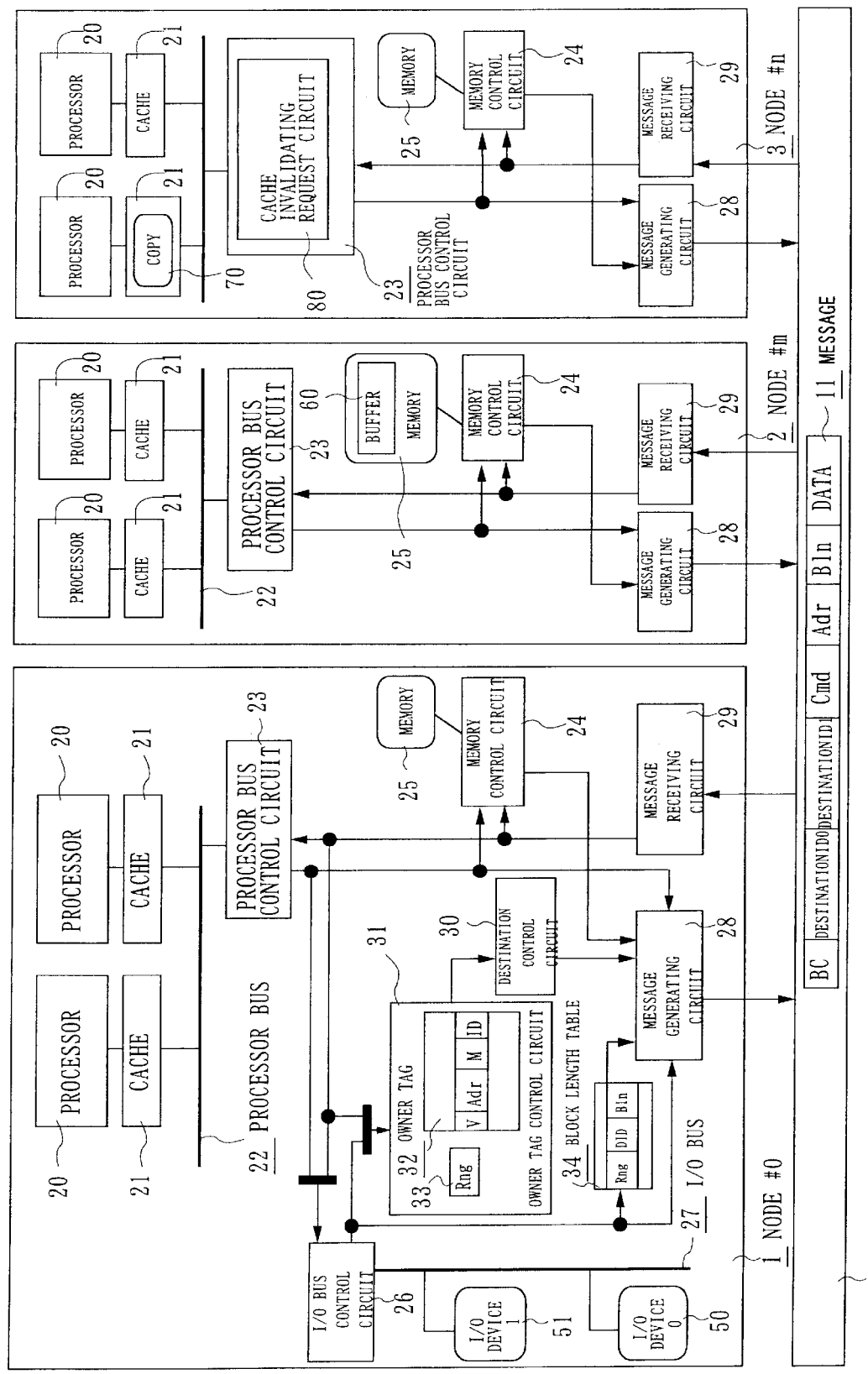
FIG. 1 is a block diagram showing a multiprocessor system according to an embodiment of the present invention.

An embodiment of a multiprocessor system according to the present invention will be described below in detail with reference to the drawings. In all the drawings illustrating the embodiment, the same reference numerals denote the same or similar components.

FIG. 1 shows a multiprocessor system according to an example of the present embodiment. In the multiprocessor system, a plurality of nodes 1, 2 and 3 are coupled through a node switch 10. Each of the nodes 1, 2 and 3 includes at least one processor 20, a cache (=cache memory) 21 for holding a copy of a memory which the processor 20 recently accesses, a memory 25 shared by all the processors, and an I/O device 50. In FIG. 1, a node #0 fills the role of a requester node, a node #m fills the role of a request destination node, and a node #n fills the role of a response node. These nodes will be described below according to their roles. In order to avoid the complexity of the drawings, moreover, portions which are not related to the roles relative to the nodes are partially omitted in FIG. 1. However, each of all the nodes according to the example of the present embodiment actually has the same structure, and therefore, can fill any of the above-mentioned roles. In the following, when an I/O processing device provided in the node #0 is to carry our read access or write access of a buffer 60 assigned to the node #n, description will be mainly given to the case in which the node #n holds a copy 70 of this buffer 60 in the cache 21.

The present embodiment has a first feature that the cache 21 has the "updated" copy 70 during DMA read for the buffer 60 from the I/O device 50 of the node #0. That is, the first feature is one that, in the case where the processor 20 of the node #n is specified, a read request in sent only to memories 25 of the node #n and #m instead of being broadcast to all the processors. And, the present embodiment has the second feature that, during the DMA write for the buffer 60 from the I/O device 50 of the node #0, the copy 70 of the buffer 60 provided in the caches of all the processors is collectively invalidated at one time by a one-time DMA write request. For the two features, when the I/O device 50 accesses the DMA read in the node 1, the node 1 is provided with an owner tag control circuit 31 for having control of which cache has the "updated" copy at a certain time for the buffer 60, and a destination control circuit 30 for deciding whether or not a DMA read request is broadcast to all the processors according to the state of the owner tag 32. Moreover, when the I/O device 50 accesses the DMA write, in the case where a DMA access unit (block length) of the I/O device 50 is fixed, the node 1 is provided with a block length table 34 for controlling this block length, and a message generating circuit 28 constituting a message 11 including the block length obtained by the block length table. Furthermore, when receiving the message 11 specified by a block length, each of the nodes 1, 2 and 3 is provided with a cache invalidating request circuit 80 for issuing an invalidating request of the cache 21 to a processor bus 22 for a continuous region specified by the block length from a starting address specified by the message 11.

A circuit and an operation of the present embodiment will be described below in detail.

Nodes 1, 2 and 3

As shown in FIG. 1, each of the nodes 1, 2 and 3 is constituted by a plurality of processors 20 for executing both a user program and an operating system, and a memory 25, and a plurality of I/O devices 50, and a message generating circuit 28 for generating an access request message 11 for the other nodes, and a message receiving circuit 29 for receiving the message 11 sent from the other nodes. This multiprocessor system is a so-called parallel computer of a physically distributed logic sharing memory type, and the memory 25 can be accessed by all the nodes. In the present embodiment, a program executed by each of the processors, an operating system, and the like are stored. Furthermore, in the requester node, the buffer 60 for exchanging data between the I/O device 50 and the operating system is stored.

Moreover, the cache 21 storing the copy of a memory which the processor 20 recently accesses is connected to the processor 20, and furthermore, the memory 25 and the I/O device 50 can be accessed through a processor bus 22. A processor bus control circuit 23 broadcasts a memory reference request of the processor 20 issued by the processor bus 22, through the message generating circuit 28 to all the nodes. In the case in which the message 11 received from the message receiving circuit 29 is the memory reference request, in order to examine whether the cache holds the copy of data specified by this request or not, the processor bus control circuit 23 is provided with a cache invalidating request circuit 80 for issuing a snoop request to the processor bus 22.

On the other hand, the I/O device 50 is connected to an I/O bus 27 and can access the memory 25 through an I/O bus control circuit 26. Moreover, each I/O device 50 can be accessed by a memory mapped I/O method, without a distinguishing the memory 25 at a memory access instruction such as a load instruction or a store instruction from each of the processors 20.

The message generating circuit 28 assembles the message 11 and transmits the assembled message to the assembling node switch 10, by the memory reference request sent from the processor 20 or the memory reference request sent from the I/O device 50.

The message receiving circuit 29 receives the message 11 from the node switch 10. According to a command Cmd field and an object address Adr field which are specified by the message 11, if an object address is a memory, the message receiving circuit 29 issues a memory reference request to the memory control circuit 24 and issues a cache consistency guarantee request to the processor bus control circuit 23. If the object address is the I/O device 50, the message receiving circuit 29 issues an I/O device reference request to the I/O bus control device. In this multiprocessor system, it is premised that the cache 21 does not have a copy for a memory region assigned to the I/O device.

Figure 3:
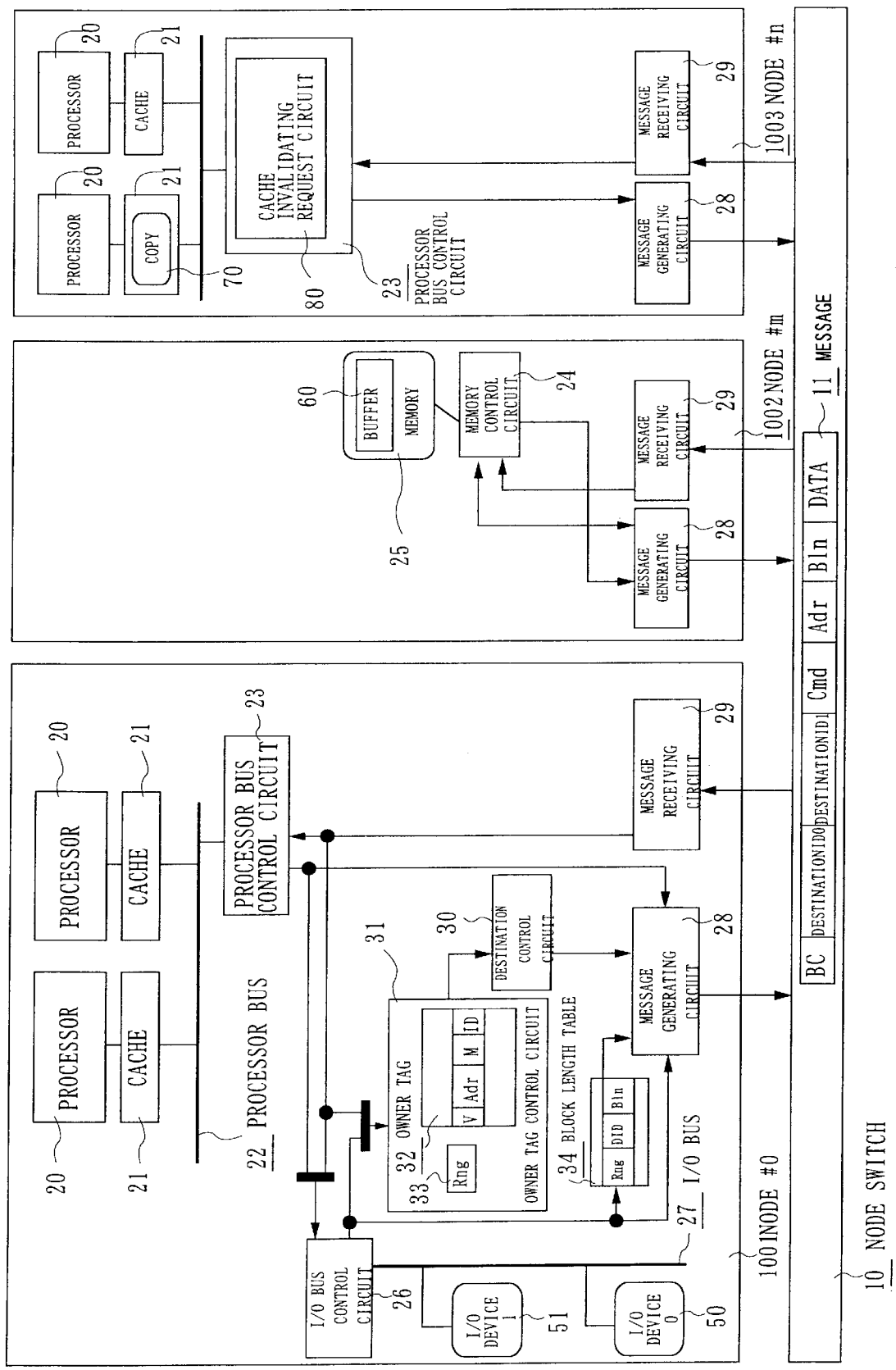
FIG. 3 is a block diagram showing a first variant of the multiprocessor system according to the embodiment of the present invention.

Although the example in which the memory 25 is distributed into each of the nodes is described in the present embodiment, the memory 25 may be collectively provided in one node, or a node may not have the processor 20 and the I/O device 50 but only a memory (see FIG. 3). Moreover, although the example in which the I/O device 50 is distributed into each of the nodes is described, the I/O device may be collectively provided in one node, or a node which does not include the processor 20 and the memory 25 may be provided (see FIG. 4).

Node Switch 10

The node switch 10 has the following three functions based on both a destination and a BC field specified by the message 11 whose configurations are not particularly defined. First of all, if BC is 1, the message 11 is transferred to all the nodes. In this case, reference is not made to a destination ID0 and a destination ID1. If the BC is 0 and only the destination ID0 is specified, the message 11 is transferred to only a node specified by the destination ID0. If BC is 0 and both of the destinations ID0 and ID1 are specified, the message 11 is transferred to two nodes specified by the destinations ID0 and ID1.

In the following, description will be given to such a procedure that the I/O device 50 at the node #0 carries out the DMA read or DMA write of the buffer 60 ensured by the node #m.

Initialization of Buffer 60

The operating system ensures the buffer 60 for exchanging data per each I/O device 50 in the memory 25 during the activation of the system. In general, the buffer 60 for exchanging data between the I/O device 50 and the operating system can not become an object of a swap out. Therefore, the buffer 60 is fixedly ensured on a physical memory during the activation of the system and this fixed place is rarely changed.

Initialization of Owner Tag Control Circuit 31

The starting address and the size of the buffer 60 ensured on the memory 25 are set to a range register 33 (which will be hereinafter referred to as an Rng). All bits V indicating that the entry of the owner tag 32 is effective are cleared to 0. In this stage, the copy of the buffer 60 is not present in any cache 21. This can easily be implemented by invalidating the cache 21 according to the conventional art.

However, if the buffer 60 for exchanging data between the I/O device 50 and the operating system cannot be ensured fixedly, a value indicative of invalidity is specified by the range register 33. Consequently, the owner tag 32 becomes invalid for a memory reference access of the I/O device 50, and the memory reference request is broadcast to all the nodes through the node switch 10 by the same manner as the conventional art.

Initialization of Block Length Table 34

In the block length table 34, an ID per each I/O device 50 is specified to a DID, and the starting address and the size of the buffer 60 are specified to the Rng field. Next, the DMA access unit of the I/O device 50 is set to a block length Bln field. In general, each I/O device 50 corresponds to the feature of an I/O device. For example, if the I/O device 50 is a disk device, there is an optimum value of a memory access for maximally deriving performance such as an access unit of a disk and the operating system is used as an activation parameter of the system.

However, as described above, if the buffer 60 which the I/O device 50 accesses can not be fixedly ensured on the memory 25 or if the access unit of the I/O device 50 is varied for each access, then an entry is not registered in the block length table 34 for the I/O device 50. Consequently, the block length table 34 becomes invalid in relation to the I/O device 50 and the memory reference request issued from the I/O device 50 is broadcast to all the nodes through the node switch 10 in the same manner as the conventional art.

The multiprocessor system according to the present embodiment is characterized by only an access to the buffer 60 and has the same access as the conventional art relative to an access other than the above-mentioned access. First of all, the access from the processor to the buffer 60 thereof will be classified as follows and respective operations will be described in detail. In the multiprocessor system according to the present embodiment, an "MESI protocol" is used as a coherence management protocol of a cache. The MESI protocol means a method of managing a state of the cache for a certain object address by the following four states, and is generally used.

M state: the state of having an "updated" copy in only one cache of the system,

E state: the state of exclusively having an "unupdated" copy in only one cache of the system, S state: the state of having an "unupdated copy" in one or more caches, and I state: the state of having no cache in a copy.

1. Load Instruction of Processor 20 to Buffer 60:

1.1 the case where no cache 21 holds a copy of an object address, 1.2 the case where a copy of an object address of a cache 21 is set in the E or M state, and 1.3 the case where a copy of an object address of one or more caches 21 is set in the S state.

2. Store Instruction of Processor 20 to Buffer 60:

2.1 the case where no cache 21 holds a copy of an object address, 2.2 the case where a copy of an object address of a cache 21 is set in the E or M state, and 2.3 the case where a copy of an object address of one or more caches 21 is set in the S state.

1. Load Instruction of Processor 20 to Buffer 60

1.1 The case in which no cache 21 holds a copy of an object address:

The processor 20 issues a load instruction to an address representing the buffer 60. In this case, the cache 21 is set in such a state (I state) that a copy for the address is not present. Therefore, a read request is issued to the processor bus 22. When the read request is issued, the processor bus control circuit 23 gives the message generating circuit 28 an instruction to broadcast the read request to all the nodes. The message generating circuit 28 sets the BC bit to 1, and sets "memory read through a processor" to the Cmd field, and invalidates the destination ID0 and the destination ID1 to constitute the message 11, and sends the message 11 to the node switch 10. Because the BC bit of the message 11 is 1, the node switch 10 broadcasts the message 11 to all the nodes. In node 1, the message receiving circuit 29 receives the message 11. And if it is apparent in each cache 1 that the Cmd field is the "memory read through a processor", the following three processings are carried out.

Report Processing of Cache State

In order to decide whether or not the copy of the address is present in the cache 21 of each node, the processor bus control circuit 23 issues a cache check request to the processor bus 22. The caches monitors the processor bus 22 and checks the state of the copy based on this request. In the present case, since no cache has the copy, the report that no cache holds the copy is given to the processor bus control circuit 23. The processor bus control circuit 23 reports that the copy is not present in the cache, to the node switch 10 through the message control circuit 28. The node switch 10 broadcasts the report to all the nodes. In the present case, as the cache 21 in no node has the copy, a copy 70 of the cache 21 in the node #n issuing the request is changed into the E state. Since this is easily implemented by a general method used in the snoop bus of an MESI type, detailed description will be omitted.

Access of Memory

The memory control circuit 24 carries out the following operation only in the case in which an address specified by the Adr field of the message 11 is indicative of its own memory 24. Herein, only the memory control circuit 24 in the node #m is carried out. In the present case, no node has an "updated" copy. Therefore, data are read from the memory 24 and are returned to the node #n through both the message generating circuit 28 and the node switch 10. In the node #n issuing a request, the message receiving circuit 29 receives the data and the processor bus control circuit 23 outputs the data to the processor bus 22 to write the data as a copy 70 to the cache 21. Consequently, the processor 20 can utilize the read data.

Update of Owner Tag 32

The owner tag control circuit 31 compares the address specified by the Adr field of the message 11 with the range register 33 and carries out the following processing because an access to the buffer 60 is determined. The Adr field of the message 11 is used as an index to check the owner tag 32. If there is no entry, the entry is ensured. If there is an entry, the entry is set as follows. "1" is set to a V bit indicating that the entry is effective. The Adr field of the message 11 is copied for an Adr field. "0" is set to an M bit indicating that the memory is an owner. And, a node identifier of the node #n is given to an ID field indicating which cache is an owner. In the present embodiment, since the cache 21 in the node collectively carries out hit check through the processor bus 22, only the node #n is set. If the cache in the node is coupled through the switch and the hit check of each cache can be carried out independently, the identifier of a cache issuing a node number request may be added.

1.2 The case in which the copy of the object address of a cache 21 is set in the E or M state:

When the cache 21 of the processor 20 issuing a read request is set in the E or M state, since the cache hits, nothing is output to the processor bus 22. Description will be given to an operation to be carried out in the case in which a cache other than the cache 21 of the processor 20 issuing a request is set in the E or M state. In the same manner as 1.1, the "memory read through both a processor" request is broadcast to all the nodes through the processor bus control circuit 23 and the node switch 10. In the same manner as 1.1, the following three processings are also carried out in each of the nodes.

Report of Cache State

In nodes in which the state of the cache 21 is not the E nor M state, the report of "a copy is not present in the node" is given to all the nodes through the node switch 10 as described in the 1.1

In the case in which the cache 21 is set in the E state, the state of this cache 21 is changed to S and the report that an "unupdated" copy is held is given to all the nodes through the message generating circuit 28 and the node switch 10. When the message receiving circuit 29 accepts the report that the "unupdated" copy is held in the node #n issuing a request, the report that the "unupdated" copy is present is given to the cache 21 through the processor bus control circuit 23. Consequently, the copy 70 of the cache 21 is changed into the S state. Since this is easily implemented by a method generally used in the snoop bus of an MESI type, detailed description will be omitted.

On the other hand, in the case in which the cache 21 is set in the M state, the state of the cache 21 is changed into the I state and the report that an "updated" copy is held is given to all the nodes through the message generating circuit 28 and the node switch 10. Then, the "updated" copy is returned to the memory 25 ensuring the buffer 60 through the message generating circuit 28 and the node switch 10, and is sent to the node #n issuing a request. When the report that the "updated" copy is held is received at the node #n, the cache 21 is changed to the E state and the "updated" copy sent through the node switch 10 is written to the cache 21. Consequently, the processor 20 can utilize the read data.

Access of Memory

The same processing as the above-mentioned 1.1 is carried out. In the case in which there is a node having the "updated" copy, however, the read access to the memory is not carried out.

Update of Owner Tag 32

The owner tag control circuit 31 compares the address specified by the Adr field of the message 11 with the range register 33, and carries out the following processing because an access to the buffer 60 is determined. The Adr field of the message 11 is used as an index to check the owner tag 32. If there is no entry, the entry is ensured. If there is an entry, the following two cases can be supposed.

If a cache is set in the E state, as shown in the above-mentioned 1.1, "1" is set to a V bit of the entry, the Adr field of the message 11 is set to an Adr field, "0" is set to an M bit, and a node identifier having the cache 21 in the E state is set to an ID field. In the case in which there is an entry, the following setting is carried out for the present entry. In the case in which there is not an entry, the following setting is carried out for a newly ensured entry. "1" is set to a V bit indicating that the entry is effective, the Adr field of the message 11 is copied for the Adr field, "1" is set to an M bit indicating that the memory is an owner, and an ID field indicating which cache is an owner is invalidated.

On the other hand, in the case in which the state of a cache is the M state, the same setting as the setting carried out in the E state will be described in 2.1 to 2.3 as described hereinafter. If there is an entry, the following setting is carried out for the entry. If a new entry is created, the entry is set as follows. "1" is set to a V bit indicating the entry is effective, the Adr field of the massage 11 is copied for an Adr field, "0" is set to an M bit indicating that a memory is an owner, and a node identifier of the node #n is set to an ID field indicating which cache is an owner. In the present embodiment, since the cache 21 in the node collectively carries out hit check through the processor bus 22, only the node #n is set. If the caches in the node are coupled through a switch and the hit check for each cache can be carried out independently, then the identifier of the cache issuing a node number request may be added.

1.3 The case in which the copy of the object address of one or more caches 21 is set in the S state:

When the cache 21 of the processor 20 issuing a read request is in the S state, nothing is output to the processor bus 22 because the cache hits. Therefore, description will be given to the case in which a cache other than the cache 21 of the processor 20 issuing a request is set in the S state. In the same manner as the above-mentioned 1.1, a "memory read through a processor" request is broadcast to all the nodes through the processor bus control circuit 23 and the node switch 10. In each of the nodes, the following three processings are carried out in the same manner as the above-mentioned 1.1.

Report Processing of Cache State

In the nodes in which the cache 21 is set in a state other than the S state, the report that "there is not a copy in the node" is given to all the nodes through the node switch 10 as described in the 1.1.

In the case in which the cache 21 is set in the S state, the report that an "unupdated" copy is held is given to all the nodes through the message generating circuit 28 and the node switch 10. When the message receiving circuit 29 accepts the report that the "unupdated" copy is held in the node #n issuing a request, the report that the "unupdated" copy is present is given to the cache 21 through the processor bus control circuit 23. Consequently, the copy 70 of the cache 21 is changed into the S state. Since this is easily implemented by a method generally used in the snoop bus of an MESI type, detailed description will be omitted.

Access of Memory

The same setting as the above-mentioned 1.1 is carried out. In the present case, since there is not a cache having the "updated" copy, the request node always receives data from the memory 25.

Update of Owner Tag 32

The owner tag control circuit 31 compares the address specified by the Adr field of the message 11 with the range register 33, and carries out the following processing because an access to the buffer 60 is determined. The Adr field of the message 11 is used as an index to check the owner tag 32. If there is an entry, as described in the "update of owner tag 32 in the E state" of the above-mentioned 1.2, "1" is set to a V bit, the Adr field of the message 11 is set to an Adr field, "1" is set to an M bit, and an ID field is invalidated. This state is not changed, however. On the other hand, if there is not an entry, an entry is newly ensured and the following setting is carried out. More specifically, "1" is set to a V bit, the Adr field of the message 11 is copied for an Adr field, "1" is set to an M bit, and an ID field is invalidated.

2. Store Instruction of Processor 20 to Buffer 60

In the present embodiment, an MESI protocol is used. Therefore, description will be given on the premise of a "write back type" in which a copy is sent to a cache for a store instruction of a processor and then the copy is updated.

2.1 The case in which no cache 21 holds a copy of an object address:

Description will be given to the case in which the processor 20 in the node #n stores the buffer 60. The processor 20 issues a store instruction to an address representing the buffer 60. In this case, the cache 21 is set in such a state (I state) that a copy for the address is not present. Therefore, an owner request is issued to the processor bus 22. The owner request is a request for ensuring the property of this address for a whole system and for data on the cache, and is generally used for the MESI protocol. When the owner request is issued, the processor bus control circuit 23 gives the message generating circuit 28 an instruction to broadcast the owner request to all the nodes. The message generating circuit 28 constitutes a message 11 in which "1" is set to a BC bit, a "memory owner request through a processor" is set in a Cmd field, and destinations ID0 and ID1 are invalidated, and then sends the message 11 to the node switch 10. The node switch 10 broadcasts the message 11 to all the nodes because the BC bit of the message 11 is 1. In each node 1, the message receiving circuit 29 receives the message 11. If it is determined that the Cmd field is the "memory owner request through a processor", the following three processings are carried out.

Report Processing of Cache State

In order to decide whether or not the copy of this address is present in the cache 21 of each of the nodes, the cache invalidating request circuit 80 in the processor bus control circuit 23 issues a cache invalidating request to the processor bus 22. The caches 21 monitors the processor bus 22 and checks the state of the copy on the basis of this request. In the present case, since no cache has the copy, a report that any cache does not hold the copy is given to the processor bus control circuit 23. The cache invalidating request circuit 80 reports that the node 1 does not have the copy, to the node switch 10 through the message control circuit 28. The node switch 10 broadcasts the report to all the nodes. In the present case, as the cache 21 in no node has the copy, a copy 70 of the cache 21 in the node #n issuing the request is temporarily changed into the E state. As this is easily implemented by a general method used in the snoop bus of an MESI type, detailed description will be omitted.

Access of Memory

The memory control circuit 24 carries out the following operation only in the case in which an address specified by the Adr field of the message 11 is indicative of its own memory 24. Herein, only the memory control circuit 24 in the node #m carries out the following operation. In the present case, since no node has an "updated" copy, data are read from the memory 24 and are returned to the node #n through the message generating circuit 28 and the node switch 10. In the node #n issuing a request, the message receiving circuit 29 receives this data and the processor bus control circuit 23 outputs the data to the processor bus 22 to write the data as a copy 70 to the cache 21. Consequently, the processor 20 overwrites write data on a copy to change the state of the copy into the M state.

Update of Owner Tag 32

The owner tag control circuit 31 compares the address specified by the Adr field of the message 11 with the range register 33 and carries out the following processing because an access to the buffer 60 is determined. The Adr field of the message 11 is used as an index to check the owner tag 32. If there is no entry, the entry is ensured. If there is an entry, the entry is set as follows. "1" is set to a V bit indicating that the entry is effective, the Adr field of the message 11 is copied for an Adr field, "0" is set to an M bit indicating that the memory is an owner, and a node identifier of the node #n is given to an ID field indicating which cache is an owner. In the present embodiment, since the cache 21 in the node collectively carries out hit check through the processor bus 22, only the node #n is set. If the cache in the node is coupled through the switch and the hit check of each cache can be carried out independently, then the identifier of a cache issuing a node number request may be added.

2.2 The case in which the copy of the object address of a cache 21 is set in the E or M state:

When the cache 21 of the processor 20 issuing a write request is set in the E or M state, the cache hits. Therefore, nothing is output to the processor bus 22 because of already being an owner. Herein, description will be given to an operation to be carried out in the case in which a cache other than the cache 21 of the processor 20 issuing a request is set in the E or M state. In the same manner as the above-mentioned 2.1, the "memory owner request through a processor" is broadcast to all the nodes through the processor bus control circuit 23 and the node switch 10. In the same manner as the above-mentioned 2.1, the following three processings are carried out in each of the nodes.

Report of Cache State

In nodes in which the cache 21 is set to a state other than the E and M states, the report of "a copy is not present in the node" is given to all the nodes through the node switch 10 as described in the above-mentioned 2.1

If the cache 21 is set in the E state, the state of the cache 21 is changed to the I state and reports "a copy is not present in the node" to all the nodes through the node switch 10.

On the other hand, if the cache 21 is set in the M state, the state of the cache 21 is changed into the I state and the report that an "updated" copy is held is given to all the nodes through the message generating circuit 28 and the node switch 10. Then, the "updated" copy is rewritten to the memory 25 ensuring the buffer 60 through both the message generating circuit 28 and the node switch 10, and is sent to the node #n issuing a request. When the report that the "updated" copy is held is received at the node #n, the cache 21 is changed into the E state and the "updated" copy sent through the node switch 10 is written to the cache 21. Consequently, the processor 20 overwrites the store data and makes the cache changed into the M state.

Access of Memory

The same processing as the above-mentioned 2.1 is carried out. In the case in which there is a node having the "updated" copy, however, the read access to the memory is not carried out.

Update of Owner Tag 32

The owner tag control circuit 31 compares the address specified by the Adr field of the message 11 with the range register 33, and carries out the following processing because an access to the buffer 60 is determined. The Adr field of the message 11 is used as an index to check the owner tag 32. If there is no entry, the entry is ensured. If there is an entry, the following two cases can be supposed.

If a cache is set in the E state, as shown in the above-mentioned 1.1, "1" is set to a V bit of the entry, the Adr field of the message 11 is set to an Adr field, "0" is set to an M bit, and a node identifier having the cache 21 in the E state is set to an ID field. In the case in which there is an entry, the following setting is carried out for the present entry. In the case in which there is not an entry, the following setting is carried out for a newly ensured entry. "1" is set to a V bit indicating that the entry is effective, the Adr field of the message 11 is copied for an Adr field, "0" is set to an M bit indicating that the memory is an owner, and a node identifier of the node #n is set to an ID field indicating which cache is an owner. In the present embodiment, since the cache 21 in the node collectively carries out hit check through the processor bus 22, only the node #n is set. If the caches in the node are coupled through a switch and the hit check for each cache can be carried out independently, then the identifier of the cache issuing a node number request may be added.

2.3 The case in which the copy of the object address of one or more caches 21 is set in the S state:

In the present case, there are two kinds of cases in which the cache 21 of the processor 20 issuing a store request is set in the S and I states. In both cases, because there is not an ownership for the address, the same operation is carried out to acquire the ownership. Therefore, description will be given to the case in which a cache other than the cache 21 of the processor 20 issuing a request is set in the S state. In the same manner as the above-mentioned 1.1, a "memory owner request through a processor" is broadcast to all the nodes through the processor bus control circuit 23 and the node switch 10. In each of the nodes, the following three processings are carried out in the same manner as the above-mentioned 2.1.

Report Processing of Cache State

In a node in which the cache 21 is set to a state other than the S state, the report that "there is not a copy in the node" is given to all the nodes through the node switch 10 as described in the above-mentioned 2.1.

In the case in which the cache 21 is set to the S state, the state of the cache 21 is changed into the I state and the report of "there is not a copy in the node" is given to all the nodes through the message generating circuit 28 and the node switch 10. When the report of "there is not a copy in the node" is received from all the nodes, the cache 21 of the node issuing the request is temporarily changed into the E state.

Access of Memory

The same processing as the above-mentioned 2.1 is carried out. In the present case, since there is not a cache having the "updated" copy, a request node always receives data from the memory 25. Then, the store data are overwritten to the cache 21, and thereby the state of the cache is changed into the M state.

Update of Owner Tag 32

The owner tag control circuit 32 compares the address specified by the Adr field of the message 11 with the range register 33, and carries out the following processing because an access to the buffer 60 is determined. The Adr field of the message 11 is used as an index to check the owner tag 32. If there is an entry, as described in the update of the owner tag 32 of the M state of the above-mentioned 1.2, "1" is set to a V bit indicating that the entry is effective, the Adr field of the message 11 is copied for an Adr field, "0" is set to an M bit indicating that the memory is an owner, and a node identifier of the node #n is set to an ID field indicating which cache is an owner. In the present embodiment, since the cache 21 in the nodes collectively carries out hit check through the processor bus 22, only the node #n is set. If the cache in the nodes is coupled through a switch and the hit check for each cache can be carried out independently, then the identifier of the cache issuing a node number request may be added.

In the case in which the cache 21 is replaced, the owner tag 32 is not updated. The reason is that a request is not given to a processor bus when the cache set in the E state is replaced generally in the MESI protocol. When the cache set in the M state is replaced, an operation referred to as "write back" is carried out, and it is generally unnecessary to broadcast a "write back" request in the MESI protocol. The reason is as follows: it is guaranteed that one cache set in the M state is present in the system at most and it is not necessary to check other caches. Accordingly, the "write back" request is not broadcast to each of the nodes and the owner tag 32 is not updated.

As described above, in the case in which the cache 21 is brought into the E or M state in relation to the access of the processor 20 to the buffer 60, a V bit of the owner tag 32 is set to "1", an accessed address is set to an Adr field, an M bit is set to "0", and a node identifier holding this cache is stored in an ID field. On the other hand, when the cache 21 is changed into the S state, the V bit is set to "1", the accessed address is set to the Adr field, the M bit is set to "1", and the ID field is invalidated. In general, capacity of the owner tag 32 is not always enough to control the whole buffer 60. In this case, an entry which is always present is overwritten when a new entry is ensured and, thereby, only an address which is recently accessed is controlled. Which cache is overwritten is easily implemented by using a general LRU (Least Recently Used) algorithm.

Next, description will be made of an operation of accessing the buffer 60 through the I/O device 50. In a computing system according to the present embodiment, the operation carried out during read access from the I/O device 50 is varied on the basis of the state of the owner tag 32. Therefore, detailed description will be given to the following three classified cases.

3. Read Access of I/O Device 50 to Buffer 60:
   3.1 the case in which the owner tag 32 is mishit,
   3.2 the case in which the owner tag 32 hits and an M bit is 0, and
   3.3 the case in which the owner tag 32 hits and an M bit is 1.

And, an operation carried out during write access from the I/O device 50 is varied on the basis of the state of the block length table 34. Therefore, detailed description will be given to the following two classified cases.

4. Write Access of I/O Device 50 to Buffer 60:
   4.1 the case in which the block length table 34 has an effective entry for the I/O device 50, and
   4.2 the case in which the block length table 34 does not have an effective entry for the I/O device 50.

3. Read Access of I/O Device 50 to Buffer 60

Description will be made of an operation carried out during read access from the I/O device 50. In the following, description will be given on the premise that the buffer 60 is ensured for the node #m and the cache 21 holding the copy of the buffer 60 is present in the node #n. And, the operation thereof is not varied on the basis of this positional relationship. During the read access from the I/O device 50, it is important that data obtained by finally updating the buffer 60 in the system is correctly read. Since the multiprocessor according to the present embodiment carries out cache consistency control by using the MESI protocol, it is guaranteed that there is only one "updated" cache in the system. Accordingly, it is guaranteed that the newest data are present in the cache set in the M state, or are present in the cache set in the memory if the cache in the M state is not present.

3.1 The case in which the owner tag 32 is mishit:

As described in the initialization of the owner tag 32, in the case in which the buffer 60 for exchanging data between the I/O device 50 and the operating system is not fixedly ensured, the range register 33 is invalidated and the owner tag 32 is always treated as to make a mistake during the read access from the I/O device 50. In some cases, moreover, the buffer 60 is fixedly ensured but an entry corresponding to the access address is not present in the owner tag 32 when the I/O device 50 carries out the read access of the buffer 60 by executing replacement or the like of the owner tag 32. In both cases, since the following operation is carried out, the latter case will be particularly described.

For example, when data are transferred to the I/O device 50 such as a disk device by the operating system, the operating system first ensures the buffer 60 and stores data in the buffer 60 in response to a store instruction. Then, the starting address of the buffer 60 is specified by the I/O device 50 to activate DMA read by a conventional method such as a memory mapped I/O or the like. The I/O device 50 continuously issues a read request for an address expressed by (Equation 1), from the starting address of the specified buffer 60 to the I/O bus 27.

$$\text{(Address)} = \text{(starting address of buffer 60)} + \text{(cache line size)} \times n, \quad \text{(Equation 1)}$$

where n is an integer of 1 to [(size of buffer 60)/(cache line size)].

When accepting the read request issued by the I/O device 50, the I/O bus control device 26 transmits a request address to the owner tag control device 31. The owner tag control device 31 compares the request address with the range register 33. If the request address is included in a region specified by the range register 33 described in the initialization of the range register 33, that is, (Equation 2) is true, then the following operation is carried out. If the (Equation 2) is false, a report of mishit is transmitted to the I/O bus control device 26.

$$\text{(Starting address)} \leq \text{(request address)} \leq \text{(starting address)} + \text{(size of region)} \quad \text{(Equation 2)}$$

If the (Equation 2) is true, the owner tag control device 31 uses the request address as an index to check the entry of the owner tag 32. In the present case, since the owner tag 32 does not have an entry corresponding to the request address, the owner tag control device 31 transmits the report of mishit to the I/O bus control device 26.

Figure 2:
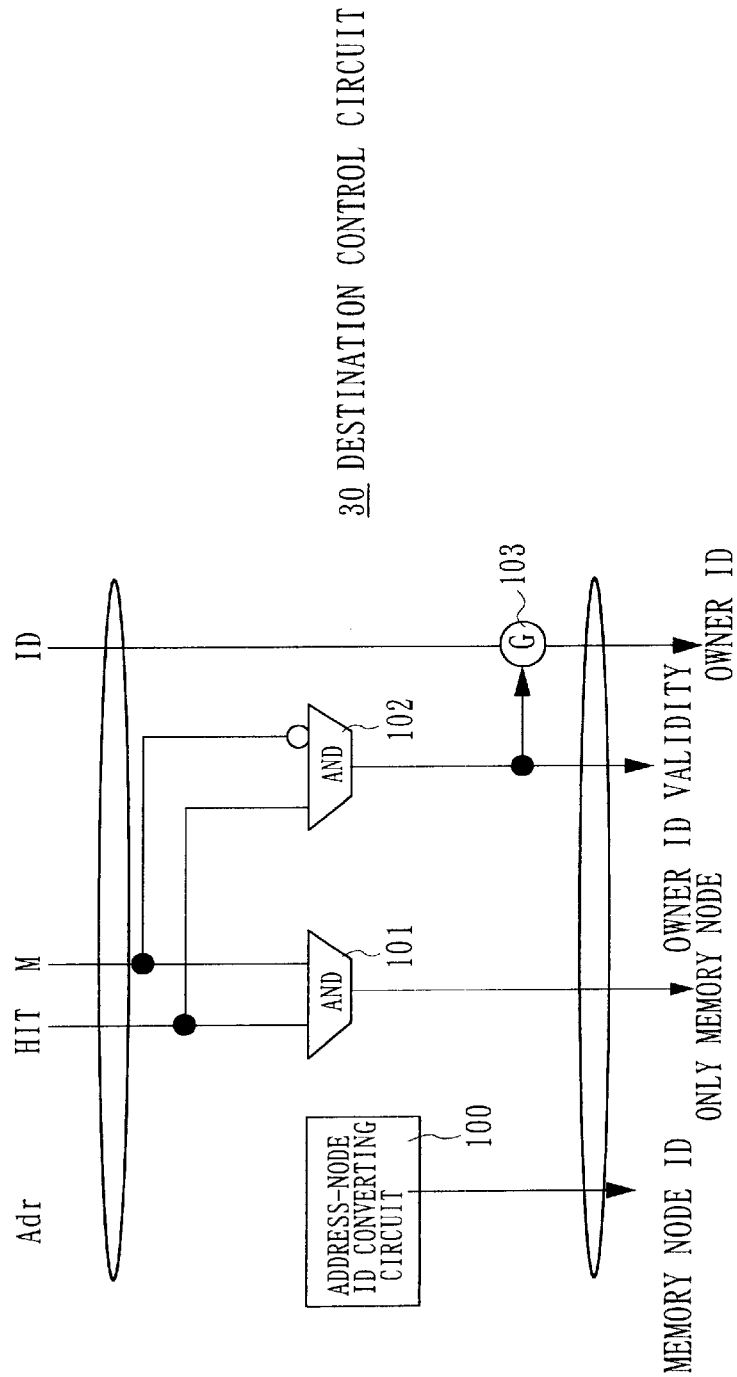
FIG. 2 is a block diagram showing a destination control circuit in the multiprocessor system according to the embodiment of the present invention.

The I/O bus control device 26 receiving the report of mishit from the owner tag control device 31 gives an instruction for issuing a read request to the message generating circuit 28. As shown in FIG. 2, in the destination control circuit 30, an input HIT signal sent from the owner tag control circuit 31 is set to 0. Therefore, both an output signal "only memory node" of an AND circuit 101 and an output "owner ID validity" of an AND circuit 102 are set to 0, respectively.

The message generating circuit 28 constitutes the following message 11 based on an issue demand of a read request sent from the I/O bus control device 26. First of all, both of the outputs "only memory node" and "owner ID validity" in the destination control circuit 30 are 0. Therefore, the BC bit is set to 1 and the destinations ID0 and ID1 are set to be invalid. Then, a "read request sent from the I/O device 50" is set in a Cmd field and a request address is set in an Adr field. Since the Cmd field is valid only at a "write request sent from the I/O device", a block length Bln field and data are not set. The generated message 11 is sent to the node switch 10. The following operation is just the same as the operation according to the conventional art in which the owner tag 32 is not present. Therefore, description will be briefly given such that a difference between the operations of 3.2 and 3.3 can be apparent.

The node switch 10, because the BC bit of the message 11 is 1, broadcasts this message 11 to all the nodes. At each of the nodes receiving the message 11, in order to check the state of the cache for the request address, the processor bus control circuit 23 issues a cache check request to the processor bus 22. Only if the cache 21 has an "updated" copy, "updated" data are returned from the cache 21 to the node #0 through the node switch 10 and the buffer 60 which is in the memory 25 of the node #m is updated. If the cache 21 does not have the "updated" copy, the buffer 60 is read from the memory 25 of the node #m and is returned in the node #0. Consequently, the I/O device 50 can read the newest data.

3.2 The case in which the owner tag 32 hits and an M bit is 0:

In the same manner as the above-mentioned 3.1, the I/O device 50 continuously issues a read request to the I/O bus 27, from the starting address of the specified buffer 60 to the address represented by the (Equation 1).

When accepting a read request issued by the I/O device 50, the I/O bus control device 26 transmits the request address to the owner tag control device 31. In the same manner as the above-mentioned 3.1, the owner tag control device 31 compares the range register 33 with the request address, and the request address always satisfies the (Equation 2) in the present case. In the present case, furthermore, when the owner tag control device 31 uses the request address as an index to check the entry of the owner tag 32, the owner tag 32 has an entry corresponding to the request address. In the present case, a V bit is 1 and an M bit is 0. As described in the access from processor, at the M bit which is 0, a node identifier in which a copy of the cache is set in the E or M state is stored in the owner ID field. At this time, there is no possibility that the cache which is in the node not specified by the node identifier is set in the E or M state. It is sufficient that a read request is issued for two nodes, that is, a node specified by this identifier and a node in which the memory 25 ensuring the buffer 60 is present, and it is unnecessary to broadcast the read request to all the nodes.

The I/O bus control device 26 receiving a report of hit from the owner tag control device 31 gives an instruction for issuing a read request to the message generating circuit 28. As shown in FIG. 2, in the destination control circuit 30, the output "only memory node" of the AND circuit 101 becomes false and the output "owner ID validity" of the AND circuit 102 becomes true. Since the signal "owner ID validity" is true, a node identifier, that is, the node #n, stored in the ID field of the entry of the owner tag 32 is output to the output "owner ID" of the destination control circuit 30. Moreover, the node #m holding the memory 25 having the buffer 60 is obtained from the request address through an address/node ID converting circuit 100, and is output to the output "memory node ID" of the designation control circuit 30.

The message generating circuit 28 constitutes the following message 11 on the basis of an issue demand of the read request sent from the I/O bus control device 26. First of all, the output "owner ID validity" of the destination control circuit 30 is true. Therefore, "0" is set to the BC bit, the node #m output to the output "memory node ID" of the destination control circuit 30 is set to the destination ID0, and the node #n output to the output "owner node ID" of the destination control circuit 30 is set to the destination ID1. Then, a "read request sent from the I/O device 50" is set in a command Cmd field and a request address is set in an Adr field. Only if the Cmd field is a "write request sent from the I/O device", a block length Bln field and a data field are valid, so that both are not set. The generated message 11 is sent to the node switch 10.

Because the BC bit of the message 11 is 0, the node switch 10 sends the message 11 only to both the node #m specified by the destination ID0 and the node #n specified by the destination ID1. In the node #n receiving this message, its own node identifier is set to the destination ID1. Therefore, the processor bus control circuit 23 issues a cache check request to the processor bus 22 in order to check the state of the cache for this request address. If the cache 21 has an "updated" copy, the report that the cache 21 has the "updated" copy is transmitted to the node #m specified by the destination ID0, and the "updated" data are returned from this cache 21 to the node #0 through the node switch 10 and the buffer 60 of the memory 25 in the node #m is updated. At this time, the state of the cache changes from the M state to the I state in the MESI protocol. If the cache 21 does not have the "updated" copy, the report that the cache 21 does not have the "updated" copy is transmitted to the node #m specified by the destination ID0. Based on this report, the data are read from the buffer 60 of the memory 25 in the node #m and are returned to the node #0. Consequently, the I/O device 50 can read the newest data. By receiving the data at the node #0, 0 is set to a V bit of an entry corresponding to the request address of the owner tag 32 and then the entry is invalidated. The reason is that there is probable that the cache 21 in the node #n is changed from the M state to the I state. If the cache 21 is set in the E state, the same operation as the conventional art is carried out so that the I/O device 50 can always read the newest data as described in the above-mentioned 3.1. Thus, if the entry of the owner tag 32 is valid and the M bit is 0, the newest data can be read without broadcasting the read request to all the nodes.

3.3 The case in which the owner tag 32 hits and the M bit is 1:

In the same manner as the above-mentioned 3.1, the I/O device 50 continuously issues a read request to the I/O bus 27, from the starting address of the specified buffer 60 to an address represented by the (Equation 1).

When accepting the read request issued by the I/O device 50, the I/O bus control device 26 transmits the request address to the owner tag control device 31. In the same manner as the above-mentioned 3.1, the owner tag control device 31 compares the range register 33 with the request address. And, in the present case, the request address always satisfies the (Equation 2). In the present case, furthermore, as the owner tag control device 31 uses the request address as an index to check the entry of the owner tag 32, an entry corresponding to the request address is in the owner tag 32. In the present case, a V bit is 1 and an M bit is 1. When the M bit is 1, as described in the access from the processor, there is no possibility that the cache of the E or M state is present in the system. Accordingly, the newest data are stored in the memory and can be read from the memory.

The I/O bus control device 26 receiving the report of hit from the owner tag control device 31 gives an instruction for issuing a read request to the message generating circuit 28. As shown in FIG. 2, in the destination control circuit 30, the output "only memory node" of the AND circuit 101 is true and the output "owner ID validity" of the AND circuit 102 is false. Since the output signal "owner ID validity" is false, the output signal "owner ID" of the destination control circuit 30 becomes invalid. On the other hand, the node #m holding the memory 25 having the buffer 60 is obtained from the request address through an address-node ID converting circuit 100 and is output to the output "memory node ID" of the designation control circuit 30.

The message generating circuit 28 constitutes the following message 11 on the basis of an issue demand of the read request sent from the I/O bus control device 26. First of all, the output "only memory node" of the destination control circuit 30 is "1". Therefore, "0" is set to the BC bit, the node #m output to the output "memory node ID" of the destination control circuit 30 is set to the destination ID0, and the destination ID1 is invalidated. Then, a "read request sent from the I/O device 50" is set in a command Cmd field and the request address is set in an Adr field. Only if being a "write request sent from the I/O device", since both a block length Bln field and data are valid, both are not set. And, the generated message 11 is set to the node switch 10.

Because the BC bit of this message 11 is "0" and the destination ID1 is invalid, the node switch 10 sends the message 11 to only the node #m specified by the destination ID0. In the node #m, the buffer 60 is read from the memory 25 and are returned to the node #0. Consequently, the I/O device 50 can read the newest data. It is unnecessary to change an entry corresponding to the request address of the owner tag 32 in the node #0. Thus, in the case in which the M bit of the entry of the owner tag 32 is "1", the read request is sent to only the node #m actually ensuring the memory and does not need to be broadcast to all the nodes.

4. Write access of I/O device 50 to buffer 60:

Next, description will be given to an operation carried out during the write access of the buffer 60 from the I/O device 50. For the write from the I/O device 50 to the buffer 60, it is important that the processor 20 can correctly read the contents of the buffer 60 which are updated by the I/O device 50. In the case in which the I/O device 50 rewrites data to the buffer 60, it is preferable to guarantee that all the caches in the system do not hold a copy corresponding to this address.

4.1 The case in which valid entry for I/O device 50 is in block length table:

In the present case, a block length which is a unit for receiving data from the I/O device 50 such as a disk device through the operating system is constant. In this case, the operating system ensures the buffer 60 corresponding to the block length and specifies the starting address of the buffer 60 for the I/O device 50 and activates DMA write through a conventional method such as a memory mapped I/O or the like. The operating system does not read the buffer 60 before accepting the report that the DMA write is completed, for example, interruption or the like from the I/O device 50. This is because the operating system avoids dealing erroneously with the data which are not updated yet by the I/O device 50, and is a method generally used as a producer consumer model.

First of all, the I/O device 50 continuously issues a write request to the I/O bus 27, for the starting address of the specified buffer 60.

When accepting the write request issued by the I/O device 50, the I/O bus control device 26 checks the block length table 34 and compares an identifier of the I/O device 50 with a DID field in order to obtain an entry coincident with both. Then, an address of a first write request in the buffer 60 which is sent from the I/O device 50 is compared with a starting address specified by the Rng field of this entry. Since they are coincident with each other, the next processing is carried out.

The I/O bus control device 26 gives an instruction for issuing a "write request with a block length sent from the I/O device" to the message generating circuit 28. When accepting the present request, the message generating circuit 28 sets 1 to the BC bit, invalidates the destinations ID0 and ID1, sets the "write request with a block length sent from the I/O device" to the Cmd field, sets an address of the write request, that is, the starting address of the buffer 60 to the Adr field, and sets a block length specified by the Bln field of the block length table 34, to the Bln field. Then, the message 11 storing the write data for a line in the data field is sent to the node switch 10.

Because the BC bit of the message 11 received from the message generating circuit 28 is 1, the node switch 10 broadcasts this message 11 to all the nodes.

In each of the nodes, the message receiving circuit 29 receives the message 11 and gives an instruction for invalidating the cache for a block of the Bln field length from the address specified by the Adr field of the message 11 to the processor bus control circuit 23 because the Cmd field is the "write request having a block length sent from the I/O device". The processor bus control circuit 23 follows this instruction and the cache invalidating request circuit 80 continuously issues a cache invalidating request to the processor bus 22 for an address represented by (Equation 3).

$$(\text{address}) = (\text{starting address}) + (\text{cache line size}) \times n, \quad \text{(Equation 3)}$$

where n is an integer of 1 to [(block length)/(cache line size)].

When accepting the cache invalidating request, each of the caches 21 invalidates a copy corresponding to this address. Consequently, when the processor 20 reads data from the buffer 60, the cache 21 is always mishit so that data can be read from the memory.

The processor bus control circuit 23 gives the node #0 the notice that all the cache invalidating requests are completely issued through the message generating circuit 28 and the node switch 10.

In the node #m ensuring the buffer 60, furthermore, the memory control circuit 24 writes, to the memory 25, the write data stored in the data field of the message 11. Consequently, the buffer 60 is updated.

When receiving the notice of "cache invalidation end" is received from all the nodes, the node #0 decides that the write request for the write address is completed, and continuously issues the write request to the I/O bus 27 for the address represented by (Equation 4).

$$(\text{address}) = \quad \text{(Equation 4)}$$
$$(\text{starting address of buffer 60}) + (\text{cache line size}) \times n,$$

where n is an integer of 1 to [((block length)/(cache line size))−1].

As described above, it is guaranteed that the cache 20 holding the copy of the buffer 60 is not present in the system at this time. Therefore, the I/O bus control circuit 26 gives an instruction for issuing a "write request through the I/O device which does not carry out cache check", to the message generating circuit 28. The message generating circuit 28 sets the BC bit to 0, specifies a node identifier uniquely defined from the request address, that is, the node #m in the present case, to the destination ID0, and invalidates the destination ID1. Then, the "write request through the I/O device which does not carry out cache check" is set in the Cmd field, the address of the write request is set in the Adr field, the write data are set in the data field, and then the message 11 is sent to the node switch 10. The node switch 10 sends the message 11 to only the node #m specified by the destination ID0 because, in the node switch 10, the BC bit is 0 and the destination ID1 is invalid.

Because the message receiving circuit 29 receives the message 11 and the Cmd field is the "write request through the I/O device which does not carry out cache check", the node #m writes the data stored in the data field to the memory 25 specified by the Adr field, and, thereby, updates the buffer 60. At this time, the cache 21 is not invalidated. The reason is that the invalidation of the cache is already carried out.

Thus, the message 11 to be broadcast to all the nodes for the write to the buffer 60 is only a write request for the starting address of the buffer 60, and others may be transferred to only the node #m ensuring the buffer 60.

When the DMA write to the buffer 60 is entirely completed, the I/O device 50 gives a completed report of the DMA write to the operating system by a conventional method such as interruption. Subsequently, the operating system can use the buffer 60 updated by the I/O device 50. However, if the cache 21 does not have a copy, data are read from the memory 25.

4.2 The case in which valid entry for the I/O device 50 is not in block length table 34:

As described in the initialization of the block length table 34, the present case is the case that the DMA access unit of the I/O device 50 is varied. The I/O device 50 issues a write request to an address specified by (Equation 5).

$$(\text{Address}) = \quad \text{(Equation 5)}$$
$$(\text{starting address of buffer 60}) + (\text{cache line size}) \times n,$$

where n is an integer of 0 to [(size of buffer 60)/(cache line size)].

The operation of the present case is the same as the conventional art which does not have the block length table 34, that is, a "snoop type coherent I/O method", and will be briefly described below.

In the present case, the block length table 34 does not have an entry corresponding to the I/O device 50. Therefore, the I/O bus control circuit 26 gives an instruction for issuing the "write request through I/O device" to the message generating circuit 28 per each address obtained by the (Equation 5). The message generating circuit 28 sends, on the basis of an instruction for issuing the "write request through I/O device", the node switch 10 the message 11 in which the BC bit is set to 1, the destinations ID0 and ID1 are invalidated, the "write request through I/O device" is set to the Cmd field, a write request address is set to the Adr field, the Bln field is invalidated, and write data are set to the data field.

The node switch 10 broadcasts the message 11 to all the nodes because the BC bit thereof is 1.

In each of the nodes, because the message receiving circuit 29 receives the message 11 and the Cmd field is the "write request through I/O device", an instruction for invalidating the cache for an address specified by the Adr field is given to the processor bus control circuit 23. In the processor bus control circuit 23, the cache invalidating request circuit 80 issues, to the processor bus 22, a cache invalidating request for only the address specified by the Adr field. Each cache 21 is invalidated if holding a copy for this address.

Furthermore, the data stored in the data field are written to the memory 25 in the node ensuring the buffer 60 specified by the Adr field, that is, the node #m in the present case.

And, when the DMA write is entirely completed, the I/O device 50 gives a completed report of the DMA write to the operating system as described in the above-mentioned 4.1.

Although the case in which each of the nodes has the processor 20, the memory 25, and the I/O device 50 is described in the above-mentioned embodiment, the case in which as a first variant, each of the nodes not having the memory 25, for example, a memory-dedicated node 1002 shown in FIG. 3 is provided will be described. In FIG. 3, the memory 25 is not provided on each of the nodes but only the memory-dedicated node 1002.

Only a difference between the above-mentioned embodiment and the first variant will be described below. Referring to first to fourth processing of the above-mentioned embodiment, (Access of Memory) is not carried out at a node #0 1001 and a node #n 1003. At a node #m 1002, moreover, only (Access of Memory) is carried out and both (Report Processing of Cache State) and (Update of Owner Tag 32) are not carried out.

Figure 4:
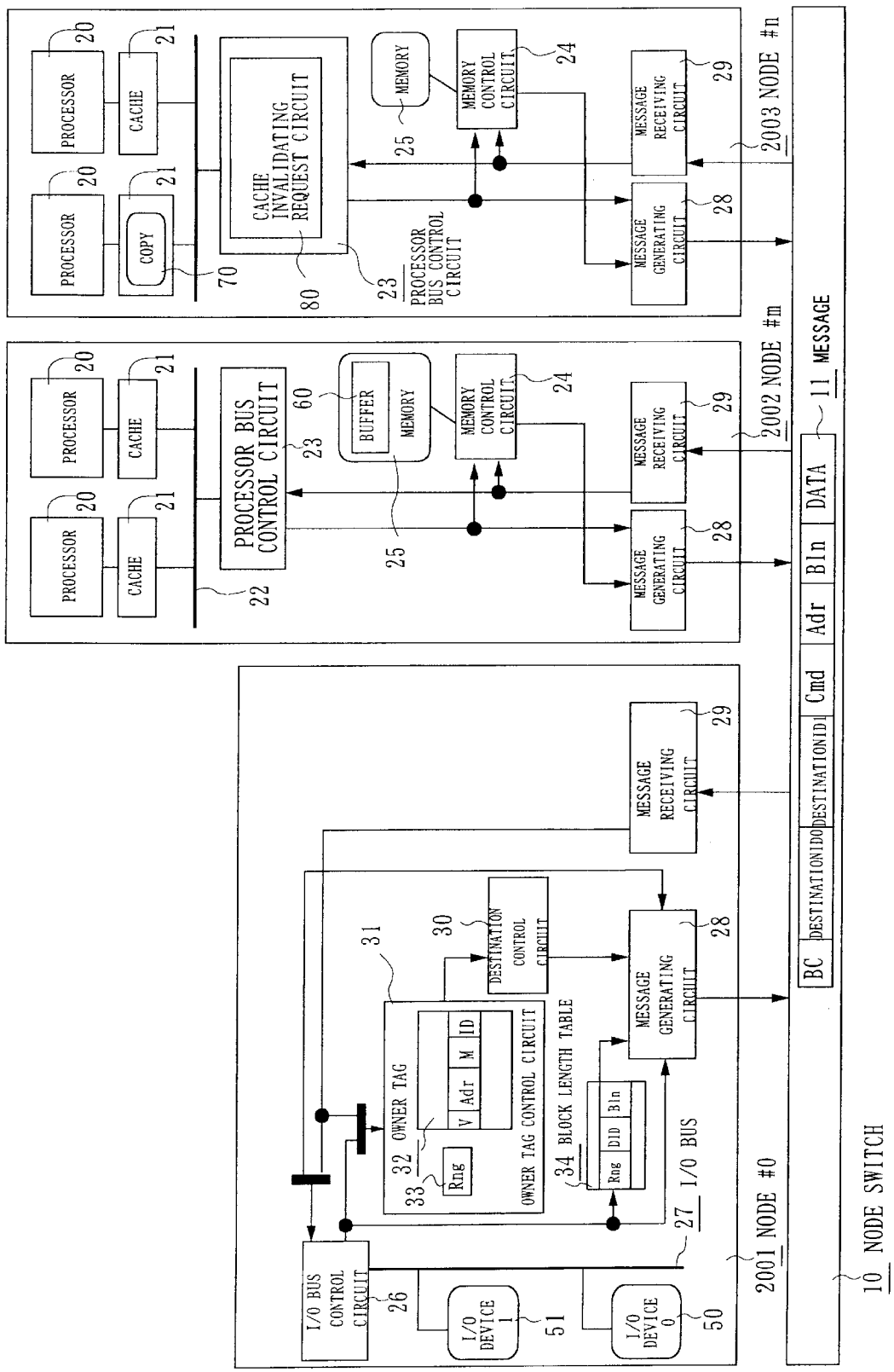
FIG. 4 is a block diagram showing a second variant of the multiprocessor system according to the embodiment of the present invention.

Furthermore, the case in which each of the nodes has the processor 20, the memory 25 and the I/O device 50 is described in the above-mentioned embodiment and the case in which each of the caches does not have the memory 25 and the memory-dedicated node 1002 as shown in FIG. 3 is provided is described in the first variant. As a second variant, description will be given to the case in which the I/O device 50 is provided on only an I/O-dedicated node 2001. For example, the I/O device 50 is not provided on each of the nodes but on only the I/O-dedicated node 1002 as shown in FIG. 4.

Only a difference between the above-mentioned embodiment and the second variant will be described below. Referring to the first to fourth processing of the above-mentioned embodiment, (Access of Memory) and (Report Processing of Cache State) are not carried out at a node #0 2001. A node #m 2002 and a node #n 2003, moreover, carry out (Access of Memory) and (Report Processing of Cache State) but does not carry out (Update of Owner Tag 32).

As described above, although the invention made by the present inventors is specifically described on the basis of the embodiment thereof, the present invention is not restricted to the above-mentioned embodiment and it is needless to say that various modifications can be made without departing from the scope thereof.

What is claimed is:

1. A multiprocessor system having at least one processor and a cache memory per the at least one processor, the multiprocessor comprising a sharing memory type multiprocessor wherein a plurality of nodes having both the at least one processor and the cache memory, and a plurality of I/O devices share a memory through a network, the sharing memory type multiprocessor including a first means for recording one of both an identifier of the cache memory if the cache memory has an exclusive copy of a memory location capable of being cached and the report that no cache memory, otherwise, has the exclusive copy, wherein when one of the processor and the I/O device issues a read request for the memory location capable of being cached, the first means carries out one of:
a first step of, if the identifier is recorded, transmitting a message for determining whether or not only the cache memory with the exclusive copy has an updated copy, and carrying out one of, when the cache memory with the exclusive copy has an updated copy, supplying data from the cache memory with the exclusive copy and of, otherwise, reading data from the memory;
a second step of, if the report is recorded, reading data directly from the memory; and
a third step of, if the identifier is recorded and a cache memory other than the cache memory with the exclusive copy has an updated copy, transmitting a message for determining whether or not all of the cache memories have updated copies, and carrying out one of, when at least one of all of the cache memories has an updated copy, supplying data from the at least one of all of the cache memories and of, otherwise, supplying data from the memory.

2. The multiprocessor system according to claim 1, wherein further comprising a destination control means for determining whether or not a read request is broadcast to all the nodes in accordance with a state of the first means,
wherein the destination control means carries out one of:
a fourth step of, when the first means is mishit, broadcasting the read request to all the nodes;
a fifth step of, when the first means is hit and a bit showing that the memory is an owner is a first state, broadcasting the read request to both a node specified by the identifier and a node having a memory; and
a sixth step of, when the first means is hit and a bit showing that the memory is an owner is a second state, broadcasting the read request to only a node having a memory.

* * * * *